United States Patent
Pimentel et al.

(10) Patent No.: US 12,363,565 B2
(45) Date of Patent: Jul. 15, 2025

(54) SYSTEM AND METHOD FOR CALCULATING AND MANAGING MAXIMUM NUMBER OF SELLABLE CUSTOMER PREMISE EQUIPMENT IN A FIXED WIRELESS ACCESS COMMUNICATION NETWORK

(71) Applicant: ASPIRE TECHNOLOGY LIMITED, Sandyford (IE)

(72) Inventors: Pedro Pimentel, Dublin (IE); Brian McCormack, Dublin (IE); Jose Rodriguez, Dublin (IE)

(73) Assignee: Aspire Technology Limited, Sandyford (IE)

( * ) Notice: Subject to any disclaimer, the term of this patent is extended or adjusted under 35 U.S.C. 154(b) by 348 days.

(21) Appl. No.: 18/017,670

(22) PCT Filed: Jul. 26, 2021

(86) PCT No.: PCT/EP2021/070895
§ 371 (c)(1),
(2) Date: Jan. 24, 2023

(87) PCT Pub. No.: WO2022/018302
PCT Pub. Date: Jan. 27, 2022

(65) Prior Publication Data
US 2023/0276251 A1    Aug. 31, 2023

(30) Foreign Application Priority Data
Jul. 24, 2020   (EP) ..................................... 20187585

(51) Int. Cl.
*H04W 24/10*   (2009.01)
*H04L 41/0896*  (2022.01)
(Continued)

(52) U.S. Cl.
CPC ......... *H04W 24/04* (2013.01); *H04L 41/0896* (2013.01); *H04W 16/18* (2013.01); *H04W 24/10* (2013.01)

(58) Field of Classification Search
CPC ..... H04W 24/04; H04W 16/18; H04W 24/10; H04W 24/02; H04L 41/0896; H04L 43/16; H04L 43/0888
See application file for complete search history.

(56) References Cited

U.S. PATENT DOCUMENTS 8,369,792 B2    2/2013  Townley et al.
2001/0029545 A1*  10/2001  Takahashi ............... H04L 43/00
                                                    709/239
(Continued)

FOREIGN PATENT DOCUMENTS

EP       3174329 A1    5/2017
WO    2010108540 A1    9/2010
(Continued)

OTHER PUBLICATIONS

PCT/EP2021/070895 International Search Report & Written Opinion (Nov. 19, 2021). 16 pages.

*Primary Examiner* — Chuong A Ngo
(74) *Attorney, Agent, or Firm* — Anthony Smyth; LOZA & LOZA, LLP

(57) ABSTRACT

The present invention relates to a system and method for calculating spare capacity in a Fixed Wireless Access (FWA) communication network at sector and network level. The capacity is measured in terms of sellable customers, that is, the number of Customer Premises Equipment (CPEs) that can be connected to a sector in order to deliver a minimum guaranteed downlink speed at a busy hour to each user. Using the available technical assets, business requirements (installation metrics, guaranteed speed, sales rate, CPE categories) and the performance of each individual sector and (Continued)

customer (cell and user delivered throughputs, radio quality of existing customers, activity ratio of existing customers), the present invention enables accurate estimation of the remaining number of sellable customer premise equipment, and to identify capacity bottlenecks, forecast capacity expansions and plan marketing campaigns or promotions. In addition, the invention provides the ability to identify sectors with no spare capacity and provides inferences on the reasons for the no spare capacity state. The system as per the present invention comprises a computing unit having a comparison unit and a user interface for enabling the aforementioned method.

15 Claims, 2 Drawing Sheets

(51) Int. Cl.
*H04W 16/18* (2009.01)
*H04W 24/04* (2009.01)

(56) References Cited

U.S. PATENT DOCUMENTS

| | | | |
|---|---|---|---|
| 2011/0136478 A1* | 6/2011 | Trigui | H04W 24/02 455/418 |
| 2018/0060458 A1 | 3/2018 | Zhao et al. | |

FOREIGN PATENT DOCUMENTS

| | | |
|---|---|---|
| WO | 2018099569 A1 | 6/2018 |
| WO | 2020121084 A1 | 6/2020 |

* cited by examiner

SYSTEM AND METHOD FOR CALCULATING AND MANAGING MAXIMUM NUMBER OF SELLABLE CUSTOMER PREMISE EQUIPMENT IN A FIXED WIRELESS ACCESS COMMUNICATION NETWORK

CLAIM OF PRIORITY

This application is the U.S. National Stage of International Patent Application No. PCT/EP2021/070895 filed 26 Jul. 2021, which claims priority to European Patent Application No. EP 20187585.3 filed 24 Jul. 2020, both of which applications are incorporated herein by reference in their entirety.

FIELD

The present disclosure relates to a system and method for calculating and managing maximum number of sellable customers in a Fixed Wireless Access (FWA) communication network.

BACKGROUND

Fixed wireless access communication networks use a fixed antennae system at each subscriber's premises. Each subscriber antenna communicates wirelessly with a base station. In order to meet the capacity demand, fixed wireless access networks divide a geographic area to be covered into cells. Within each cell is a base station with which each of the subscriber antennas communicate.

There are various methods and models known in the art to estimate how many customers can be connected to a specific sector in a Fixed Wireless Access network. These models however do not consider key factors such as live network performance and individual customer metrics; and are not designed to work on a per-sector basis. Different sectors will have very different capacities even with the same bandwidth and antenna solutions. Another issue with methods known in the art is the lack of adaptability to each fixed wireless access service provider. Factors such as customer usage profiles, the provider's business model and radio environment cannot be neglected.

Further, most of the known methods were not designed specifically for fixed wireless access networks; vendors and service providers typically adapt such methods from mobile networks, while regulators use a fixed broadband approach to guide fixed wireless access service providers. Examples of systems and methods known in the art include patent publication numbers WO2018/099569 (Ericsson); WO2020/121084 (Ericsson); EP3174329 (ZTE); WO2010/108540 (Nokia) and US2018/060458 (Zhao Wenwen et al).

There is therefore a need for an improved system and method for accurately calculating the spare capacity of a FWA network, forecast sales, plan capacity expansions, avoid over-selling and detect and react to under-performing issues and this forms the primary objective of the present invention.

SUMMARY OF INVENTION

The present invention relates to a system and method for calculating spare capacity for each specific sector in a Fixed Wireless Access communication network, and if the spare capacity of a sector is zero, for determining the most likely reason for that, as set out in the appended claims. The capacity is measured in terms of sellable customers, i.e. the number of Customer Premises Equipment (CPEs) that can be connected to a sector in order to deliver a minimum guaranteed downlink speed at busy hour to each user.

In one embodiment of the present invention, there is provided a method for determining spare capacity of a sector of a Fixed Wireless Access (FWA) communication network having a plurality of active users during a predetermined time period. The plurality of active users is at least two and the method is performed during a predetermined time period such as the busiest hour of the sector. The method comprises the steps of evaluating the number of downlink active users of the selected sector and the average downlink user throughput, inputting the minimum downlink throughput guaranteed to each user at busy hour, comparing the average downlink user throughput with the minimum downlink throughput, inputting a plurality of calculations if the compared downlink user throughput exceeds the minimum downlink throughput, the plurality of calculations including the maximum downlink sector throughput, sector customer activity ratio, expansion risk level, minimum expansion risk level and the number of existing customer premise equipment in the sector; determining total sector capacity (measured in maximum number sellable customers) by dividing maximum downlink sector throughput with the product of minimum downlink throughput during the predetermined time period (i.e. guaranteed downlink speed to each user at busy hour) and the activity ratio; and determining sector spare capacity calculated as the product of the expansion risk level and the difference between the total sector capacity and the number of existing customer premise equipment in the sector. It is important to note that the plurality of calculations are made for each individual sector as opposed to traditional vendors that take a fixed value.

It will be appreciated that while there is a minimum number of two users it is note that the average number of active users during a specific hour is not a whole number, it can have decimals. The number two is the initial recommendation based on a standard LTE TDD network. That number is to be agreed with the service provider in each deployment.

As per another preferred embodiment of the present invention, there is provided a method for determining spare capacity of a sector of a Fixed Wireless Access (FWA) communication network having a minimal number of active users during a predetermined time period. The predetermined time period is for example the busiest hour of the sector. The method comprises the steps of evaluating the number of downlink active users for the selected sector during the predetermined time period, inputting a plurality of calculations including the maximum downlink sector throughput specific to the network and the sector configuration type, minimum downlink throughput, network specific customer activity ratio, expansion risk level and the number of existing customer premise equipment in the sector; determining sector total capacity by dividing maximum downlink sector throughput with the product of minimum downlink throughput during the predetermined time period and the activity ratio; and determining sector spare capacity calculated as the product of the expansion risk level and the difference between the total sector capacity and the number of existing customer premise equipment in the sector.

It is important to highlight that the number two is the initial recommendation based on a standard LTE TDD network. That number can be agreed with the service provider in each deployment. Other scenarios envisaged is sectors where the average number of users at busy hour is between 0 and 2 (can be less than 1, it's an average during the time period), and new sectors, i.e. sectors with no users, not live yet.

In yet another preferred embodiment of the present invention, there is provided a system for determining spare capacity of a new or existing sector of a Fixed Wireless Access (FWA) communication network. The system comprises a computing unit having a comparison unit and a user interface. The user interface is used for inputting a plurality of calculations including the maximum downlink throughput specific to the network and the sector configuration type, maximum downlink throughput specific to the sector, minimum downlink throughput, network specific customer activity ratio, sector specific customer activity ratio, expansion risk level, minimum expansion risk level and the number of existing customer premise equipment in the sector. The computing unit is configured to determine total sector capacity calculated by dividing maximum downlink sector throughput with the product of minimum downlink throughput during the predetermined time period and the activity ratio and to determine sector spare capacity wherein said sector space capacity is calculated as the product of the expansion risk level and the difference between the determined sector total capacity and the number of existing customer premise equipment in the sector.

In one embodiment the method comprises the further steps of:

evaluating the number of downlink active users and inputting the number of maximum downlink active users for the selected sector, if the downlink physical resource block utilization exceeds ninety percent;

comparing the number of downlink active users with the number of maximum downlink active users;

ascertaining the sector spare capacity to be zero as the sector is full, if number of downlink active users exceeds a predetermined second threshold value; and ascertaining the sector spare capacity to be zero as the sector has heavy users, if number of downlink active users is less than the second threshold value.

In one embodiment the second threshold value is eighty percent of the number of maximum downlink active users.

In one embodiment the number of maximum downlink active users is determined by dividing maximum downlink sector throughput with the minimum downlink user throughput.

In one embodiment the step of ascertaining sector spare capacity to be zero due to operational issues if the downlink physical resource block utilization is less than ninety percent.

The present invention has numerous technical advantages and is applicable to both 4G and 5G networks. The system and method as per the present invention enables automatic and dynamic calculation of spare capacity at the sector level as well as the network level and enables an automatic capacity calculation reacting autonomously to customer profile changes, sudden capacity increases or operational issues. The present invention provides ability to the network operator to accurately understand sellable capacity, to forecast capacity expansions, to avoid over-selling and plan marketing campaigns or promotions, and further enables automatic and dynamic diagnostics of all sectors with no spare capacity. The present invention enables the network operator to better understand capacity issues so affecting customers in the network and allows for automatic issue categorization.

The present invention can be fully adapted to changing business goals or network technical configurations. The parameter or calculation for 'Activity Ratio' allows the network operator to understand the usage profile of its customers, that is how active they are and at what times. Activity Ratio is defined as the ratio between DL active users at busy hour and number of CPEs sold on a sector. The present invention also enables network operators to enter their own inputs, namely the minimum downlink speed guaranteed at a busy hour, expected channel quality indicator average and MIMO utilization for new sectors, maximum individual sector throughput, threshold to trigger conservative capacity expansions, minimum number of downlink active users to treat existing sectors as new sector for expansion, expansion risk level and maximum number of active users to define heavy users.

BRIEF DESCRIPTION OF DRAWINGS

The novel features of the present invention are set forth in the appended claims hereto. The subject matter itself, however, as well as a preferred mode of use, further objectives, and advantages thereof, will best be understood by reference to the following detailed description of illustrative embodiments when read in conjunction with the accompanying drawings and wherein:

DETAILED DESCRIPTION OF INVENTION

Figure 1:
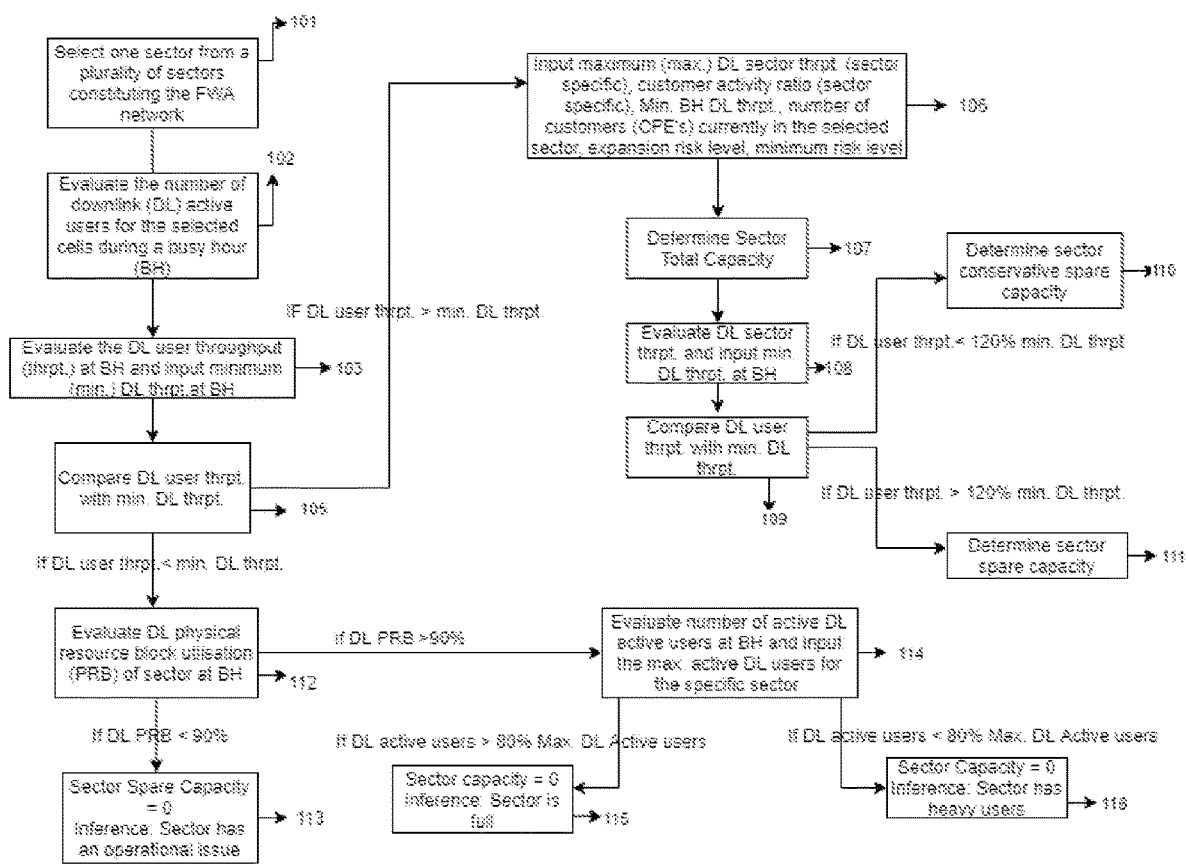
FIG. 1 is a flow diagram illustrating a method as per a preferred embodiment of the present invention.

FIG. 1 illustrates a method for determining spare capacity of a sector of a Fixed Wireless Access (FWA) communication network having a plurality of active users during a predetermined time period, as per a preferred embodiment of the present invention.

The method comprises the step of firstly selecting a sector from a plurality sectors constituting the FWA network 101. To understand the traffic of the sector, the number of downlink (DL) active users of the sector during a predetermined time period such as a busy hour of the day is evaluated 102. The number of active users as per the embodiment is above two. Further, the average DL user throughput during the busy hour is evaluated and the minimum downlink user throughput during the busy hour is inputted 103. If the evaluated average DL user throughput exceeds the minimum DL user throughput, a plurality of calculations is further inputted 106. Said inputted plurality of calculations include maximum downlink sector throughput specific to the selected sector, customer activity ratio specific to the selected sector, minimum downlink throughput during the busy hour, number of customers currently in the sector expressed in terms of the number of sold customer premise equipment, expansion risk level and minimum expansion risk level.

Maximum downlink sector throughput is calculated for the specific sector and is the product of a number of technical inputs including the number of cells in the sector, Multiple Input Multiple Output (MIMO) factor for the sector, number of available physical resource blocks per cell, number of resource blocks per physical resource block, average number of bits per resource block for the sector and Time Division Duplex (TDD) factor. All these inputs are specific to the sector configuration used except for 'average number of bits per resource element' which is calculated for the specific sector using the average Channel Quality Index (CQI) reported by the customers connected to it and for the 'Multiple Input Multiple Output (MIMO) factor' which is calculated using the existing MIMO usage for the specific sector. The minimum DL throughput during the busy hour is the minimum downlink throughput that is guaranteed per Customer Premise Equipment (CPE) and is a business/commercial input.

The customer activity ratio is the ratio between downlink active users at busy hour and the number of sold customer premise equipment on the sector. This is dependent on the type of user profile in each deployment. Different types may be defined for example comparing between enterprise and particular customers. Expansion risk level (Risk) is a factor to be applied to remove any potential risk of overselling and expansion risk level and minimum expansion risk level is a factor to be applied to reduce to the very minimum any potential risk of overselling. Further, using the inputted calculations, the sector total capacity is determined 107. Sector total capacity is calculated by the formula:—

$$\text{Sector Total Capacity} = \frac{\text{Max. } DL \text{ Sector Throughput}}{\text{Min. } avg. \ DL \text{ Throughput} \times \text{Activity Ratio}}$$

Once the sector total capacity is ascertained, the average downlink user throughput during busy hour is evaluated and the minimum downlink throughput is inputted 108, and further the average DL user throughput is compared with the minimum DL throughput 109. If the average DL user throughput exceeds a first predetermined threshold value, or in other words if the average DL user throughput is significantly greater than the minimum downlink throughput and exceeds the first predetermined threshold value, sector spare capacity is determined 111. Sector spare capacity is calculated using the formula:—

Sector Spare Capacity=Risk×(Sector Total Capacity−Sold CPEs)

If average downlink user throughput is not significantly greater than the minimum downlink throughput and does not exceed the first predetermined threshold value, the sector conservative spare capacity is determined 110. It is calculated based on the formula:—

Sector Conservative Spare Capacity=Min. Risk×(Sector Total Capacity−Sold CPEs)

Applying risk factor and minimum risk factors to calculate spare capacity removes any potential risk of overselling. In a preferred embodiment, the predetermined first threshold value is one hundred and twenty percent of the value of minimum downlink user throughput.

Further, if the average downlink user throughput during the busy hour is lesser than the minimum downlink user throughput, the downlink physical resource block utilization of the sector is determined 112. If the downlink physical resource block utilization is less than ninety percent, it is ascertained that spare capacity is zero and an inference is made that the sector has an operational issue which needs to be further investigated 113. If the determined physical resource block utilization exceeds ninety percent, number of active DL users during busy hour is evaluated and the maximum DL active users for the specific sector is inputted 114. Maximum DL active users for the sector is calculated by the formula:—

Max. DL Active Users=Max. DL Sector Throughput/Min. DL user Throughput.

The number of DL active users is compared with the maximum DL active users. If DL active users exceeds a predetermined second threshold value the sector spare capacity is ascertained to be zero and it is inferred that the sector is full 115. If the number of DL active users is less than a predetermined second threshold value, the sector spare capacity is again ascertained to be zero due to the sector having heavy users 116. In a preferred embodiment, the second predetermined value is eighty percent of the number of maximum downlink active users.

Figure 2:
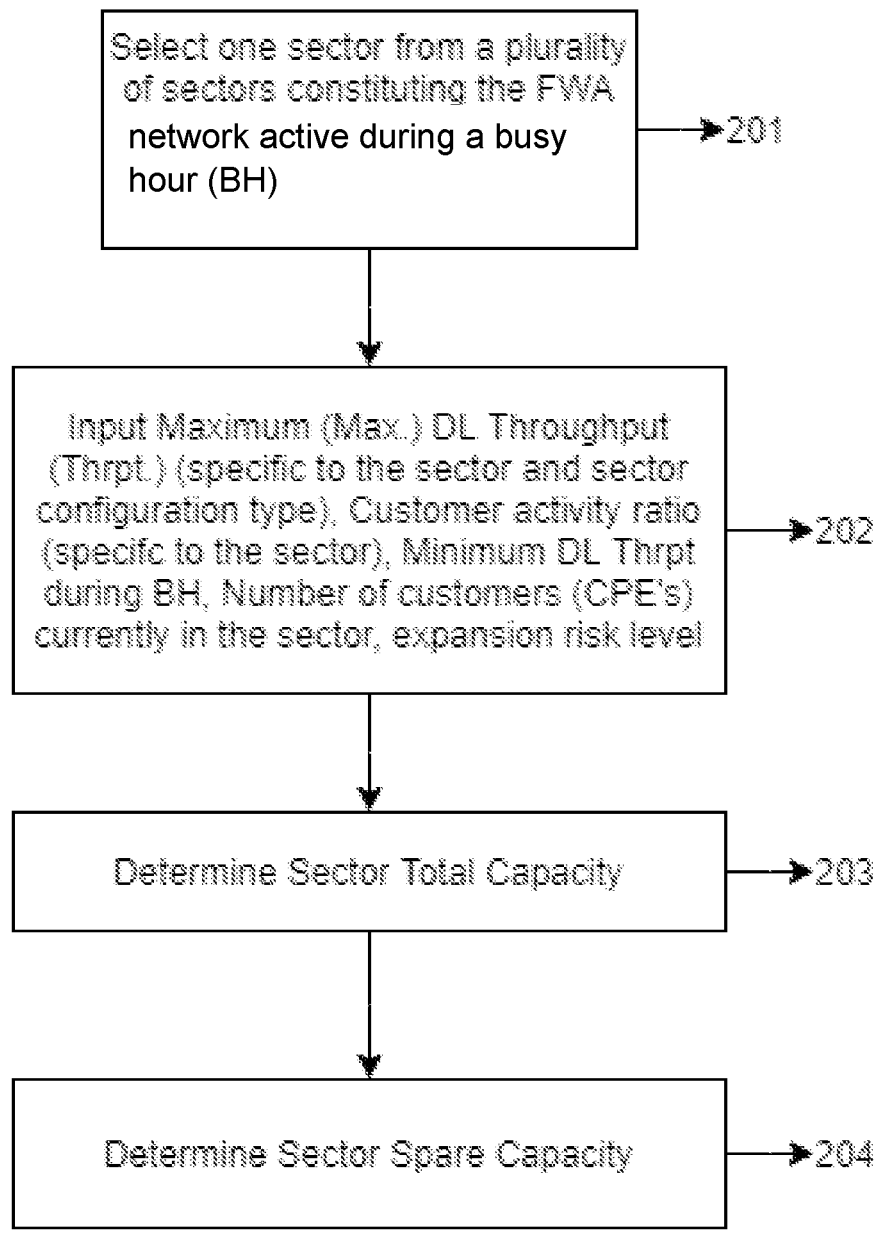
FIG. 2 is a flow diagram illustrating a method as per another preferred embodiment of the present invention.

FIG. 2 illustrates another preferred embodiment of the present invention, a method for determining spare capacity of a sector of a Fixed Wireless Access (FWA) communication network having a minimal number of active users during a predetermined time period is illustrated. The number of active users during the predetermined time period such as the busy hour of the day is minimal and insignificant. The method comprises the step of selecting a sector 201 from a plurality of sectors comprising the FWA network and inputting a plurality of calculations including the maximum DL sector throughput specific to the network and the sector configuration type, customer activity ratio specific to the network, minimum downlink throughput during the busy hour, number of existing customers in the sector expressed as the number of sold customer premise equipment in the sector, and the expansion risk level 202.

Maximum DL sector throughput is calculated for the specific configuration and is the product of a number of technical inputs including the number of cells in the sector, Multiple Input Multiple Output (MIMO) factor, number of available physical resource blocks per cell, number of resource blocks per physical resource block, average number of bits per resource block for the sector and Time Division Duplex (TDD) factor. The 'average number of bits per resource element' is calculated using the average Channel Quality Index (CQI) expected to be reported by the customers, which will be determined by the installation metrics in the service provider. Similarly, the 'Multiple Input Multiple Output (MIMO) factor' is calculated using the expected MIMO usage for sectors with such configuration, which this will be determined by the CPE category distribution sold by the service provider and by the installation metrics.

The minimum DL throughput during the busy hour is the minimum downlink throughput that is guaranteed per CPE and is a business/commercial input. The customer activity ratio is the ratio between downlink active users at busy hour and the number of sold customer premise equipment.

For these sectors, where there are a minimal number of downlink active users at busy hour, such ratio shall be an input from the service provider, based on the expected usage profile of their customers in each geographical area.

Expansion risk level (Risk) is a factor to be applied to remove any potential risk of overselling. Using the inputted calculations, sector total capacity is calculated 203, and further sector spare capacity is determined 204. Sector total capacity is determined by the formula:

$$\text{Sector Total Capacity} = \frac{\text{Max. } DL \text{ Sector Throughput}}{\text{Min. } avg. \ DL \text{ Throughput} \times \text{Activity Ratio}}$$

and sector spare capacity is determined from sector total capacity using the formula:—

Sector Spare Capacity=Risk×(Sector Total Capacity−Sold CPEs)

In yet another preferred embodiment of the present invention, a system for determining spare capacity of a new or existing sector of a Fixed Wireless Access (FWA) communication network is provided. The system comprises a computing unit having a comparison unit and a user interface.

The user interface is adapted for inputting a plurality of calculations or parameters including the maximum downlink throughput specific to the network and the sector configuration type, maximum downlink throughput specific to the sector, minimum downlink throughput, network specific customer activity ratio, sector specific customer activity ratio, expansion risk level, minimum expansion risk level and the number of existing customer premise equipment in the sector. Using the above-mentioned inputs, the computing unit is configured to determine the sector total capacity and the sector spare capacity.

The comparison unit enables performing various comparison steps relevant for determining sector total capacity and sector spare capacity. Such comparison steps include comparison between DL user throughput and Minimum DL user throughput, comparing value of DL physical resource block utilization against a threshold, and comparing DL active users with Maximum DL active users.

Although the present invention has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present invention as defined.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for determining spare capacity of a sector of a Fixed Wireless Access (FWA) communication network having a plurality of active users during a predetermined time period, the method comprising the steps of:
   a) selecting one sector from a plurality of sectors constituting the FWA network;
   b) evaluating the number of downlink active users of the selected sector and the b) average downlink user throughput;
   c) inputting the minimum downlink throughput;
   d) comparing the average downlink user throughput with the minimum downlink throughput;
   e) determining the downlink physical resource block utilization of the sector if the average downlink user throughput is lesser than the minimum downlink throughput;
   f) calculating if the compared downlink user throughput exceeds the minimum downlink throughput, by using one or more of the following: the maximum downlink sector throughput, sector customer activity ratio, expansion risk level, minimum expansion risk level and the number of existing customer premise equipment in the sector;
   g) determining total sector capacity by dividing maximum downlink sector throughput with the product of minimum downlink throughput during the predetermined time period and the activity ratio;
   h) comparing average downlink user throughput evaluated in step (b) with minimum downlink user throughput inputted in step (c);
   i) determining sector spare capacity if average downlink user throughput exceeds a first predetermined threshold value, wherein sector spare capacity is calculated as the product of the expansion risk level and the difference between the total sector capacity and the number of existing customer premise equipment in the sector; and/or
   determining the conservative sector spare capacity if the downlink user throughput is less than the first predetermined threshold value, wherein conservative sector spare capacity is calculated as the product of the inputted minimum expansion risk level and difference between the total sector capacity and the number of existing customer premise equipment in the sector.

2. The method as claimed in claim 1, further comprising the steps of:
   a) evaluating the number of downlink active users and inputting the number of maximum downlink active users for the selected sector, if the downlink physical resource block utilization exceeds ninety percent;
   b) comparing the number of downlink active users with the number of maximum downlink active users;
   c) ascertaining the sector spare capacity to be zero as the sector is full, if number of downlink active users exceeds a predetermined second threshold value; and
   d) ascertaining the sector spare capacity to be zero as the sector has heavy users, if number of downlink active users is less than the second threshold value.

3. The method as claimed in claim 2, wherein the second threshold value is eighty percent of the number of maximum downlink active users.

4. The method as claimed in claim 2, wherein the number of maximum downlink active users is determined by dividing maximum downlink sector throughput with the minimum downlink user throughput.

5. The method as claimed in claim 2, further comprising the step of ascertaining sector spare capacity to be zero due to operational issues if the downlink physical resource block utilization is less than ninety percent.

6. The method as claimed in claim 1, wherein the number of plurality of active users is at least two.

7. The method as claimed in claim 1, wherein maximum downlink sector throughput is the product of a plurality of parameters including the number of cells in the sector, number of available physical resource blocks per cell, number of resource elements per physical resource block, average number of bits per resource element, Multiple Input Multiple Output (MIMO) factor and Time Division Duplex (TDD) factor, whereby the 'average number of bits per resource element' is calculated for the specific sector using the average Channel Quality Index (CQI) reported by the customers connected to it and for the 'Multiple Input Multiple Output (MIMO) factor' which is calculated using the existing MIMO usage for the specific sector.

8. The method as claimed in claim 1, wherein sector customer activity ratio is the ratio between downlink active users at busy hour and the number of sold customer premise equipment on the sector.

9. The method as claimed in claim 1, wherein the predetermined first threshold value is one hundred and twenty percent of the value of minimum downlink user throughput.

10. A method for determining spare capacity of a sector of a Fixed Wireless Access (FWA) communication network having a minimal number of active users during a predetermined time period, the method comprising the steps of:
   a) selecting one sector from a plurality of sectors constituting the FWA network;
   b) evaluating the number of downlink active users for the selected sector during the predetermined time period;
   c) inputting a plurality of calculations including the maximum downlink throughput specific to the network and the sector configuration type, minimum downlink throughput, network specific customer activity ratio, expansion risk level and the number of existing customer premise equipment in the sector;
   d) determining total sector capacity, wherein said total sector capacity is calculated by dividing maximum downlink sector throughput with the product of minimum downlink throughput during the predetermined time period and the activity ratio; and/or
   e) determining sector spare capacity wherein said sector space capacity is calculated as the product of the expansion risk level and the difference between the determined total sector capacity and the number of existing customer premise equipment in the sector.

11. The method as claimed in claim 10, wherein maximum downlink sector throughput is the product of a plurality of calculations including the number of cells in the sector, number of available physical resource blocks per cell, number of resource elements per physical resource block, average number of bits per resource element, Multiple Input Multiple Output (MIMO) factor and Time Division Duplex (TDD) factor, whereby the 'average number of bits per resource element' is calculated using the average Channel Quality Index (CQI) expected to be reported by the customers, will be determined by the installation metrics in the service provider and the 'Multiple Input Multiple Output (MIMO) factor' is calculated using the expected MIMO usage for sectors with such configuration, to be determined by the CPE category distribution sold by the service provider and by the installation metrics.

12. The method as claimed in claim 10, wherein sector customer activity ratio is the ratio between downlink active users at busy hour and the number of sold customer premise equipment, where there are a minimal number of downlink active users at busy hour, such ratio shall be an input from the service provider, based on the expected usage profile of their customers in each geographical area.

13. The method as claimed in claim 10, wherein the total sector capacity and sector spare capacity is expressed in terms of number of customer premise equipment.

14. A system for determining spare capacity of a new or existing sector of a Fixed Wireless Access (FWA) communication network; the system comprising:
   a computing unit having a comparison unit and a user interface adapted for inputting a plurality of calculations including the maximum downlink throughput specific to the network and the sector configuration type, maximum downlink throughput specific to the sector, minimum downlink throughput, network specific customer activity ratio, sector specific customer activity ratio, expansion risk level, minimum expansion risk level and the number of existing customer premise equipment in the sector, the computing unit configured to:
   determine total sector capacity, wherein said total sector capacity is calculated by dividing maximum downlink sector throughput with the product of minimum downlink throughput during the predetermined time period and the activity ratio; and/or
   determine sector spare capacity wherein said sector space capacity is calculated as the product of the expansion risk level and the difference between the determined total sector capacity and the number of existing customer premise equipment in the sector.

15. The system as claimed in claim 14, wherein the total sector capacity and sector spare capacity is expressed in terms of number of customer premise equipment.

* * * * *